US012690710B2

(12) United States Patent
Avins et al.

(10) Patent No.: US 12,690,710 B2
(45) Date of Patent: Jul. 28, 2026

(54) TEMPERATURE CONTROL FOR EXTRACTED BEVERAGES, INCLUDING COFFEE, VIA CONTROLLED VACUUM, AND ASSOCIATED SYSTEMS AND METHODS

(71) Applicant: Coffee Technologies Inc., Portland, OR (US)

(72) Inventors: Joshua Lewis Avins, San Francisco, CA (US); Eli Salomon, San Francisco, CA (US)

(73) Assignee: COFFEE TECHNOLOGIES INC., Portland, OR (US)

( * ) Notice: Subject to any disclaimer, the term of this patent is extended or adjusted under 35 U.S.C. 154(b) by 559 days.

(21) Appl. No.: 17/861,783

(22) Filed: Jul. 11, 2022

(65) Prior Publication Data

US 2023/0064485 A1     Mar. 2, 2023

Related U.S. Application Data

(60) Continuation of application No. 17/114,343, filed on Dec. 7, 2020, now Pat. No. 11,382,451, which is a
(Continued)

(51) Int. Cl.
*A47J 31/043*          (2006.01)
*A23F 3/18*            (2006.01)
(Continued)

(52) U.S. Cl.
CPC ............... *A47J 31/043* (2013.01); *A23F 3/18* (2013.01); *A23F 5/262* (2013.01); *A23G 1/56* (2013.01)

(58) Field of Classification Search
CPC ........... A47J 31/043; A23F 3/18; A23F 5/262; A23G 1/56
See application file for complete search history.

(56) References Cited

U.S. PATENT DOCUMENTS

| | | | |
|---|---|---|---|
| 2,223,450 A | 12/1940 | Jepson | |
| 2,550,513 A | 4/1951 | Young | |
| (Continued) | | | |

FOREIGN PATENT DOCUMENTS

| | | | |
|---|---|---|---|
| CN | 1235490 | 1/2006 | |
| CN | 201046357 | 4/2008 | |
| (Continued) | | | |

OTHER PUBLICATIONS

"Pressure Brewed Coffee—Extraction Curves," http://www.espressoplanet.com/espresso-coffee-machine/pressure brewed coffee extraction.html, accessed Dec. 10, 2014, 4 pages.
(Continued)

*Primary Examiner* — Emily M Le
(74) *Attorney, Agent, or Firm* — Perkins Coie LLP

(57) ABSTRACT

Temperature control for extracted beverages, including coffee, via controlled vacuum, and associated systems and methods are disclosed. A representative system includes a brew chamber, a beverage chamber in fluid communication with the brew chamber, a vacuum source in fluid communication with the beverage chamber, and a flow control device positioned to vary the force applied by the vacuum chamber on the brew chamber via the beverage chamber.

24 Claims, 5 Drawing Sheets

Related U.S. Application Data division of application No. 16/376,897, filed on Apr. 5, 2019, now Pat. No. 10,863,854.

(60) Provisional application No. 62/742,223, filed on Oct. 5, 2018, provisional application No. 62/653,300, filed on Apr. 5, 2018.

(51) Int. Cl.
*A23F 5/26* (2006.01)
*A23G 1/56* (2006.01)

(56) References Cited

U.S. PATENT DOCUMENTS

| | | | |
|---|---|---|---|
| 2,660,948 A | 12/1953 | Forschner | |
| 2,888,349 A | 5/1959 | Morrow et al. | |
| 3,087,415 A | 4/1963 | Kaplan et al. | |
| 3,224,360 A | 12/1965 | Wickenberg | |
| 3,426,670 A | 2/1969 | Wittern | |
| 4,158,067 A | 6/1979 | Wouda | |
| 4,277,509 A | 7/1981 | Wouda | |
| 4,739,697 A | 4/1988 | Roberts | |
| 4,791,859 A | 12/1988 | King | |
| 4,967,647 A | 11/1990 | King | |
| 5,267,506 A | 12/1993 | Cai | |
| 5,479,849 A | 1/1996 | King | |
| 5,728,634 A | 3/1998 | Everheart et al. | |
| 5,897,903 A | 4/1999 | Gerhard-Rieben | |
| 6,391,360 B1 | 5/2002 | Stettes | |
| 6,697,903 B2 | 2/2004 | Massie et al. | |
| 8,383,180 B2 | 2/2013 | Vastardis et al. | |
| 9,962,030 B2 | 5/2018 | Avins | |
| 10,674,856 B2 | 6/2020 | Avins | |
| 10,863,854 B2 | 12/2020 | Avins | |
| 11,116,351 B2 | 9/2021 | Avins | |
| 11,382,451 B2 | 7/2022 | Avins | |
| 2006/0032380 A1 | 2/2006 | Klaassen | |
| 2008/0280023 A1 | 11/2008 | Kalenian | |
| 2010/0199848 A1 | 8/2010 | Lin | |
| 2010/0278988 A1 | 11/2010 | Radosav | |
| 2011/0097465 A1 | 4/2011 | Bishop | |
| 2012/0219686 A1 | 8/2012 | Bombeck | |
| 2013/0098240 A1 | 4/2013 | Wu | |
| 2013/0098249 A1 | 4/2013 | Fidler et al. | |
| 2013/0136833 A1 | 5/2013 | Vastardis et al. | |
| 2013/0220137 A1 | 8/2013 | Bombeck et al. | |
| 2014/0034676 A1 | 2/2014 | Verduin et al. | |
| 2014/0170280 A1* | 6/2014 | St. Germain | A47J 31/60 |
| | | | 426/433 |
| 2016/0007794 A1* | 1/2016 | Carmichael | A23F 5/262 |
| | | | 426/433 |
| 2016/0022087 A1 | 1/2016 | Han et al. | |
| 2016/0198886 A1 | 7/2016 | Avins | |
| 2016/0338522 A1 | 11/2016 | Van Schyndel | |
| 2017/0055759 A1 | 3/2017 | Radosav | |
| 2017/0295992 A1 | 10/2017 | Mangold et al. | |
| 2017/0367526 A1 | 12/2017 | Avins | |
| 2019/0307283 A1* | 10/2019 | Avins | A47J 31/043 |
| 2022/0104650 A1 | 4/2022 | Avins | |

FOREIGN PATENT DOCUMENTS

| | | |
|---|---|---|
| CN | 103476303 | 12/2013 |
| CN | 107529776 | 1/2018 |
| WO | WO-0130173 | 5/2001 |

OTHER PUBLICATIONS

BKON R/A/IN—Revolutionizing the Craft Beverage Industry One Cup at a Time, http://bkonbrew.com/brewing-process/ accessed Oct. 7, 2014, 3 pages.

BUNN—The Science of the Brewing Process, http://www.bunn.com/sites/default/files/brochure/e9000.0078 bunn coffee basics scae. pdf, 2008, 6 pages.

International Search Report and Written Opinion for International Patent Application No. PCT/US2019/26121, Applicant: Voga Coffee, Inc., mailed Jul. 1, 2019, 12 pages.

Extended European Search Report and Written Opinion for European Patent Application No. 19782193.7, Applicant: Voga Coffee, Inc., mailed Nov. 5, 2021, 12 pages.

* cited by examiner

313a

414a

313b

414b

TEMPERATURE CONTROL FOR EXTRACTED BEVERAGES, INCLUDING COFFEE, VIA CONTROLLED VACUUM, AND ASSOCIATED SYSTEMS AND METHODS

CROSS-REFERENCE TO RELATED APPLICATIONS

The present application is a continuation of U.S. patent application Ser. No. 17/114,343, filed Dec. 7, 2020, issued as U.S. Pat. No. 11,382,451, which is a divisional of U.S. patent application Ser. No. 16/376,897, filed Apr. 5, 2019, issued as U.S. U.S. Pat. No. 10,863,854, which claims priority to U.S. Provisional Application No. 62/653,300, filed on Apr. 5, 2018; and U.S. Provisional Application No. 62/742,223, filed on Oct. 5, 2018. Each of the foregoing provisional applications is incorporated herein by reference in its entirety.

TECHNICAL FIELD

The present technology is directed generally to temperature control for extracted beverages, including coffee, via controlled vacuum, and associated systems and methods.

BACKGROUND

Coffee has been a commonly-consumed beverage for many years. Over the course of time, many techniques have been developed to brew coffee, with each having its own advantages and disadvantages. One popular type of coffee brewing technique involves using a vacuum to separate brewed coffee from coffee grounds. For example, siphon coffee brewers were developed in the 1830's and were known to produce flavorful coffee, with little bitterness. However, the siphon brewers typically require a long extraction process, which makes them impractical for busy coffee shops. Accordingly, there remains a need for coffee brewers that produce flavorful coffee, at commercially suitable rates, while maintaining the coffee at target temperature levels.

DETAILED DESCRIPTION

The present technology is generally directed to temperature control for extracted beverages, including coffee, via controlled vacuum, and associated systems and methods. In representative examples, the disclosed techniques for controlling the vacuum applied to a coffee brewing chamber can in turn control the flow rate of coffee and/or another brewed/extracted beverage, which in turn can allow the beverage to be directed into a collection chamber as a continuous, contiguous, cohesive, and/or in at least some cases, laminar, flow, rather than as a spray of droplets or stream lets. This, in turn, reduces heat loss from the flow so that it remains at a suitable temperature for consumption.

Specific details describing structures and/or processes that are well-known and often associated with coffee (and other) brewing devices, but that may unnecessarily obscure some significant aspects of the presently disclosed technology, are not set forth in the following description for purposes of clarity. Moreover, although the following disclosure sets forth several embodiments of different aspects of the disclosed technology, several other embodiments of the technology can have configurations and/or components different than those described in this section. As such, the present technology may have other embodiments with additional elements, and/or without several of the elements described below with reference to FIGS. 1-5.

One drawback associated with the types of coffee makers described under the Background section above is that they typically cannot brew coffee in large quantities, because they rely on a steam condensation process that cannot produce sufficient vacuum flow rates to fully extract large coffee volumes. Recently, the Ground Control® coffee brewer has addressed this concern by separating large quantities of brewed coffee from coffee grounds through the use of a rocking piston vacuum pump, capable of generating high flow rates. However, there is a strong correlation between increases in the average vacuum flowrate and the degree of temperature loss in the final product. This loss of temperature is caused by coffee rapidly cooling as it sprays out into a collection chamber under vacuum. The larger the radius of the coffee spray, the larger the surface area of the coffee that is exposed to cooling. Many coffee shops seek to maximize brewed coffee temperature, because higher temperatures are desired by customers, and also increase beverage holding times. The presently disclosed technology meets the foregoing objectives of large scale and high serving temperature.

Figure 1:
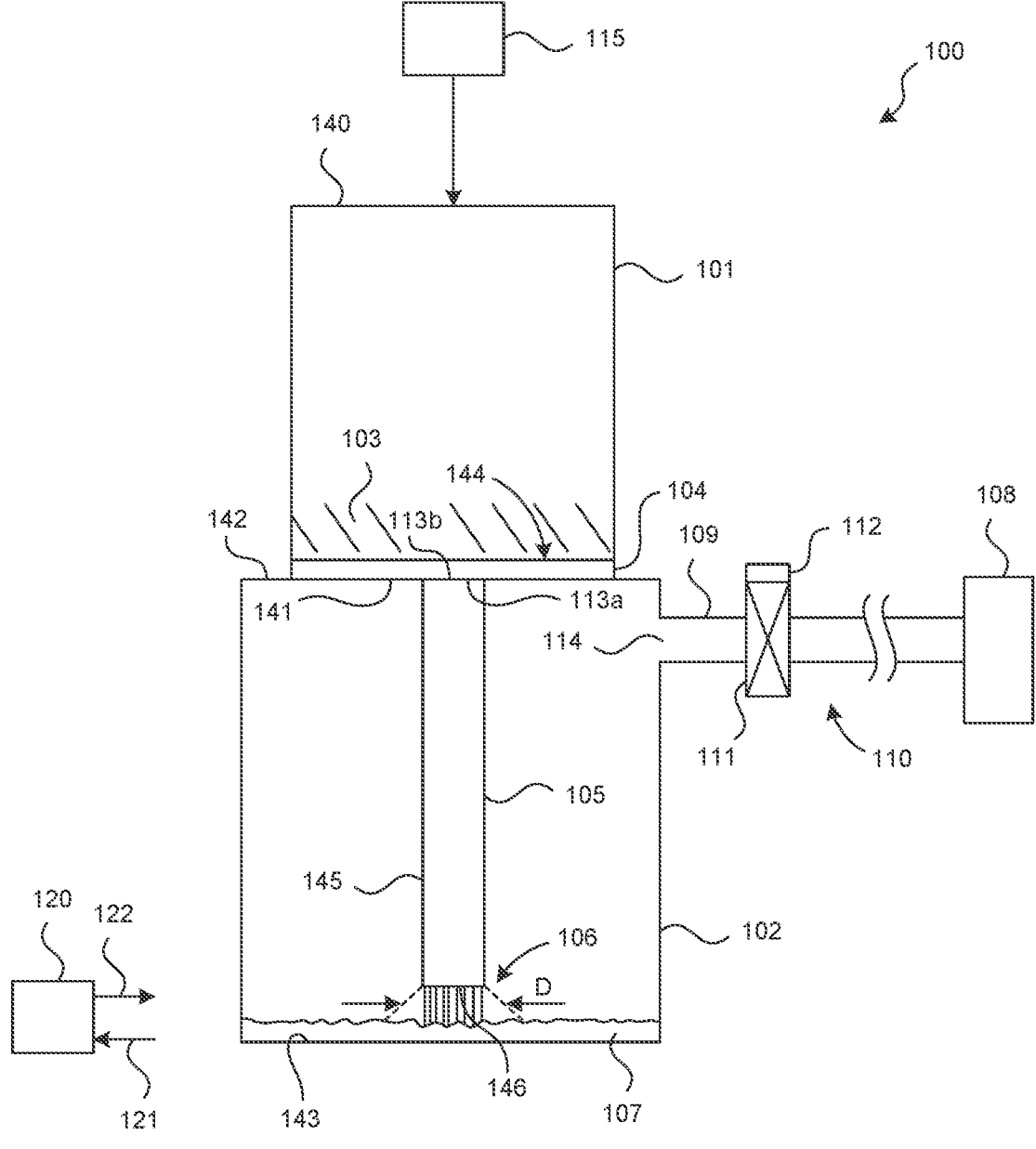
FIG. 1 is a partially schematic, side elevation view of a beverage brewing system having a flow control device configured in accordance with some embodiments of the present technology.

FIG. 1 is a partially schematic, side elevation view of a beverage brewing system 100 that includes a brew chamber 101 coupled to a beverage chamber 102. The brew chamber 101 can have an upper surface 140 and a lower surface 141, and the beverage chamber 102 can also have an upper surface 142 and a lower surface 143. The lower surface 141 of the brew chamber 101 can include a first beverage port 113a, and the upper surface 142 of the brew chamber 102 can include a second beverage port 113b. A beverage flow passage 105 (e.g., a tube 145) connects the first and second beverage ports 113a, 113b, and can extend downwardly within the beverage chamber 102. A hot water supply 115 provides hot water to the brew chamber 101, e.g., via an opening in the upper surface 140. The hot water mixes with solids 103 (e.g., coffee grounds, cacao nibs, tea leaves, and/or other materials suitable for brewing a beverage) during a brewing process. The solids 103 are supported by a support 144 (e.g., the lower surface 141 of the brew chamber 101, or a filter element 104 or a support for the filter element 104). The brewed beverage is extracted through the filter 104, along the beverage flow path 105, and out an exit opening 146, producing an extracted beverage flow 106 that is collected in the beverage chamber 102, forming a collected beverage volume 107 supported at least in part by the lower surface 143 of the beverage chamber 102.

To force the brewed beverage from the brew chamber 101 to the beverage chamber 102, the system 100 can include a vacuum flow path 109 coupled to the beverage chamber 102 (e.g., at a vacuum port 114) and to a vacuum source 108 (e.g., a rocking piston vacuum pump, another suitable vacuum pump, and/or a pre-evacuated blow-down chamber). The vacuum source 108 withdraws air from the beverage chamber 102, which in turn draws the beverage from the brew chamber 101 into the beverage chamber 102. The system 100 can include other subsystems between the vacuum source 108 and the fluid connection between the vacuum source 108 and the beverage flow path 109. A representative example is one or more coalescing filter elements positioned to remove coffee oils from the vacuum flow upstream of the vacuum source 108. For purposes of clarity, such subsystems are not illustrated in FIG. 1.

The system 100 can further include a flow control device 110, e.g., positioned along the vacuum flow path 109, to control the vacuum applied to the brew chamber 101 via the beverage chamber 102 and the beverage flow path 105. In some embodiments, the flow control device 110 includes a valve 111 coupled to an actuator 112, which controls the position of the valve 111. The actuator 112 and/or other elements of the system 100 can be controlled by a controller 120 that receives inputs 121 (e.g., from sensors, and/or from an operator or other user) and directs outputs 122 to control the hot water supply 115, the vacuum source 108, the flow control device 110, and/or other elements of the system 100.

Many embodiments of the technology described below may take the form of computer- or controller-executable instructions, including routines executed by a programmable computer or controller (e.g., the controller 120 shown in FIG. 1). Those skilled in the relevant art will appreciate that the technology can be practiced on computer/controller systems other than those shown and described herein. The technology can be embodied in a special-purpose computer, controller or data processor that is specifically programmed, configured or constructed to perform one or more of the computer-executable instructions described below. Accordingly, the terms "computer" and "controller" as generally used herein refer to any suitable data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

In operation, the flow control device 110 can have multiple available settings to produce different corresponding flows along the beverage flow path 105 and into the beverage chamber 102. For example, during an initial period of the extraction process (e.g., a first mode), the valve 111 can be set to a first position in which the vacuum source 108 applies a first vacuum force (e.g., via a first vacuum flow rate) to the brewed beverage in the brew chamber 101 via the beverage flow path 105. Because there is a significant amount of brewed beverage in the brew chamber 101 during this initial portion of the process, the amount of force required to withdraw the beverage via the beverage flow path 105 can be relatively low. Accordingly, the extracted beverage flow 106 can be in the form of a continuous, collimated, and/or contiguous flow, rather than in the form of a spray of discrete droplets and/or streamlets. As a result, the amount of heat transferred away from the extracted beverage flow 106 as it flows into the beverage chamber 102 is significantly reduced, compared to a turbulent, spray-type flow. The system can operate in the first mode for a selected period of time (e.g., 10, 15, 20 or 25 seconds), depending on factors such as system sizes and/or the flow capacity of the vacuum source 108, and/or the size of the brew chamber 101.

Toward the end of the extraction process, the brewed beverage in the brew chamber 101 becomes more difficult to extract through the solids 103 and the filter 104. For example, the level of the beverage in the brew chamber 101 may be low enough that air, as well as beverage, begins passing through the beverage flow path 105. However, it may be desirable to continue extracting the brewed beverage so as to dry out (or partially dry) the solids 103 in preparation for a subsequent brew cycle with the same set of solids 103, and/or to yield more coffee in the beverage chamber 102, and/or to more fully dry the solids 103 for ease of disposal. Accordingly, the vacuum control device 110 can be adjusted to increase the force (e.g., increase the vacuum flow rate) applied to the brewed beverage in the brew chamber 101 via the beverage flow path 105. In this mode of operation (e.g., a second mode), with additional force applied to the brewed beverage, the extracted beverage flow 106 can become turbulent, forming a spray that may extend outwardly in a lateral direction from the exit of the beverage flow path 105. The diameter D of the flow can increase, and the flow can have a conical, rather than cylindrical, shape, as shown in dashed lines in FIG. 1. As a result of being sprayed into the beverage chamber 102, the extracted beverage has more surface area exposed to the surrounding air in the beverage chamber 102 and therefore cools more rapidly. However, because only a portion of the beverage is extracted at a relatively high vacuum flow rate, the overall effect on the temperature of the collected beverage volume 107 is reduced. Accordingly, (a) the collected beverage volume 107 can be at the desired elevated temperature, while at the same time, (b) the solids 103 can be sufficiently dried (e.g., for one or more subsequent extractions using the same solids), and/or (c) the overall time to conduct the extraction process can be relatively short (e.g., 5 minutes for a volume of two liters). A typical target temperature for the extracted beverage is 170° F. Other suitable temperatures (e.g., for one or more extractions) range from 100° F. to 175° F. Further details of representative devices that perform multiple extraction processes are described in co-pending U.S. Patent Application Publication No. 2017/0367526, incorporated herein by reference. Still further details regarding multiple extraction processes and associated devices are included in U.S. Provisional Patent Application No. 62/653,300, filed on Apr. 5, 2018, and previously incorporated herein by reference.

Figure 2:
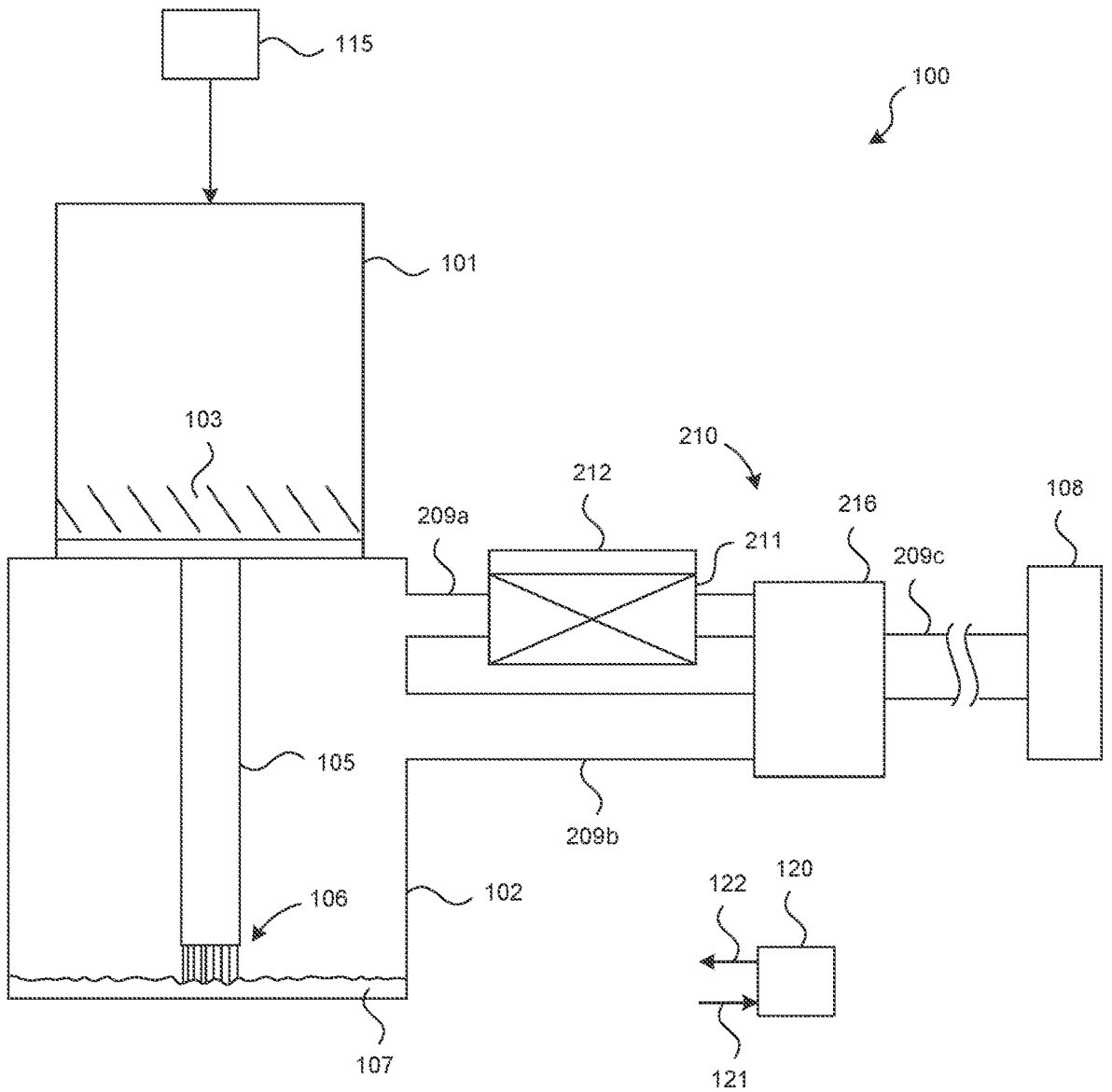
FIG. 2 is a partially schematic, side elevation view of a brew system having a multi-path flow control device configured in accordance with some embodiments of the present technology.

FIG. 2 is a partially schematic, side elevation view of a representative system 100 that includes a flow control device 210 configured in accordance with some embodiments of the present technology. The flow control device 210 can include a first vacuum flow path 209a that passes through a valve 211 (e.g., a needle valve), and a second vacuum flow path 209b with no valve. The first and second vacuum flow paths 209a, 209b can be coupled to a selector 216 (e.g., a two-position solenoid) that directs flow from either one of the first and second vacuum flow paths 209a, 209b to a common vacuum flow path 209c. The common vacuum flow path 209c is coupled to the vacuum source 108.

In operation, the valve 211 can have a fixed, low-flow position. Accordingly, when the selector 216 is coupled between the first vacuum flow path 209a and the common vacuum flow path 209c, the vacuum source 108 draws a relatively low vacuum on the beverage chamber 102, producing a steady, cohesive (and in some cases, laminar) extracted beverage flow 106. In some cases, the beverage flow 106 may swirl, while remaining cohesive. Toward the end of the extraction process, the selector 216 changes configuration to couple the second vacuum flow path 209b to the common vacuum flow path 209c, causing the vacuum source 108 to draw a high level of vacuum on the beverage chamber 102, and producing an extracted beverage flow 106 that may spray or otherwise deviate from a contiguous, cohesive flow.

One feature of an embodiment of the system shown in FIG. 2 is that the valve 211 can have a fixed setting, and the selector 216 can have a simple two-setting configuration. Conversely, an advantage of the system 100 shown in FIG. 1 is that the valve 111 can be continuously variable. In other embodiments, the system 100 can include other arrangements for varying the vacuum level, and associated extracted beverage flow rates, in a continuous or stepped manner. For example, the valve 211 shown in FIG. 2 can be a variable valve rather than a fixed valve, and can have a corresponding actuator 212 to provide an additional level of control over the vacuum applied to the beverage container 102. In any of these embodiments, the flow control device coupled in the vacuum flow path can be operated alone, or in conjunction with other flow control devices described below with reference to FIGS. 3-4B.

Figure 3:
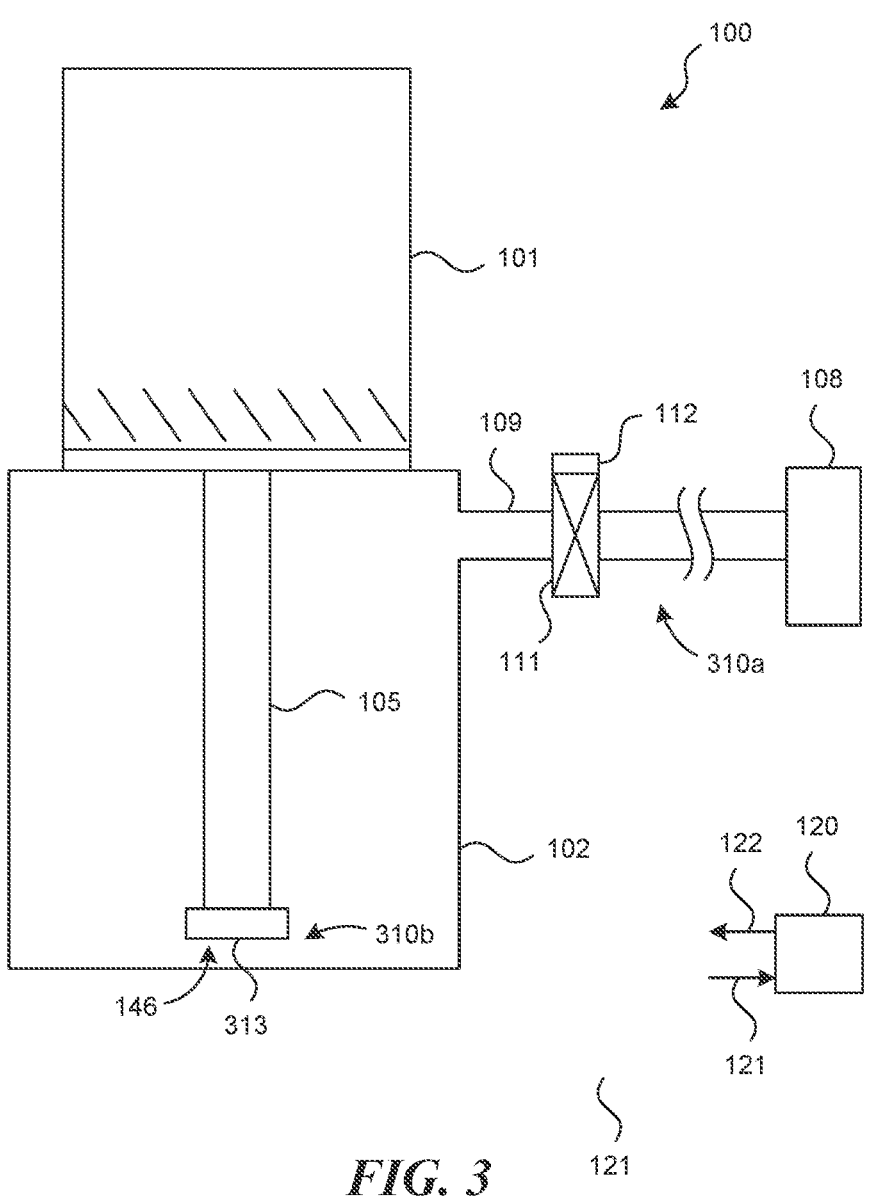
FIG. 3 is a partially schematic, side elevation view of a beverage brewing system having multiple flow control devices configured in accordance with some embodiments of the present technology.

Referring next to FIG. 3, a representative system 100 can include a first flow control device 310a having a configuration generally similar to that described above with reference to FIG. 1. In other embodiments, the first flow control device 310a can have a configuration generally similar to that shown in FIG. 2, or another suitable arrangement. The system 100 can further include a second flow control device 310b coupled to the beverage flow path 105. The second flow control device 310b can include a flow straightener 313 that facilitates a cohesive flow of the extracted beverage as it exits the beverage flow path 105 at the exit 146. Accordingly, the flow straightener 313 can be positioned proximate to the exit 146, e.g., at the exit 146 or a limited distance upstream of the exit 146, so as to facilitate the beverage flow being continuous (and in at least some cases, laminar) as the beverage exits the beverage flow path 105. For example, the flow straightener 313 can be located within a beverage flow path diameters (e.g., five diameters or less) of the exit 146. This arrangement can be used in combination with the first flow control device 310a, or in lieu of the first flow control device 310a. Accordingly, the second flow control device 310b can facilitate laminar flow at both low and high vacuum settings, and/or at a single vacuum setting, depending on whether it is used in conjunction with, or independently of, a variable vacuum arrangement. In at least some embodiments, the flow straighter can be used in conjunction with a system that does not include a vacuum source.

Figure 4A:
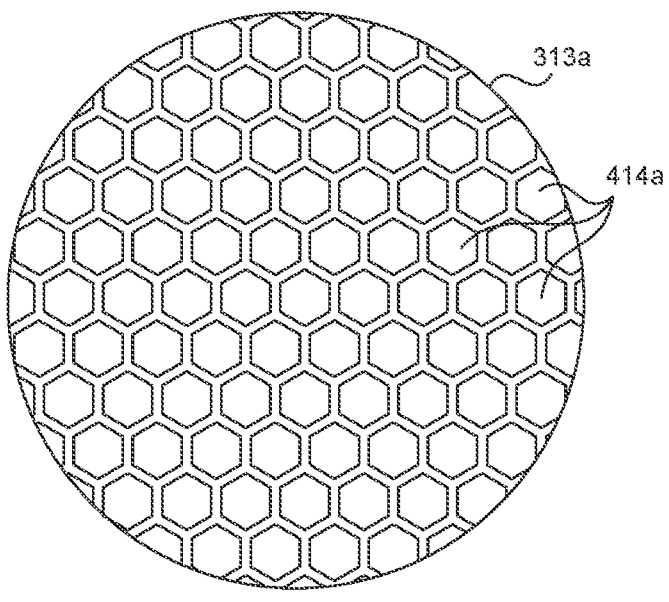
FIGS. 4A and 4B are partially schematic, cross-sectional illustrations of flow control devices including flow straighteners, configured in accordance with embodiments of the present technology.
Figure 4B:
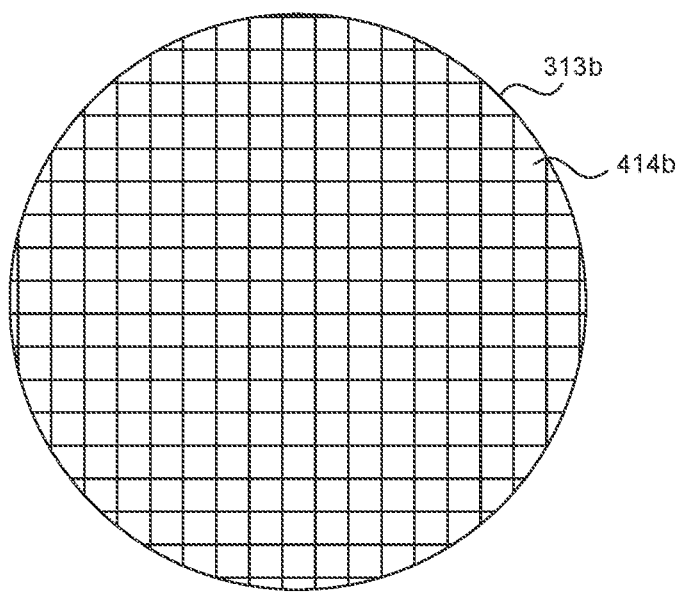

The flow straightener can include tube bundles, perforated plates, grates, and/or internal tabs, so as to reduce swirl, increase laminar flow, and/or increase the continuity and/or cohesiveness of the flow (e.g., to avoid or reduce sprays of droplets or stream lets). In some embodiments, the flow straightener can include a parallel arrangement of internal walls or baffles. For example, referring to the cross-sectional view of FIG. 4A, a representative flow straightener 313a can include flow channels 414a formed by hexagonally-arranged parallel walls. In FIG. 4B, another representative flow control device 313b can include rectangular flow channels 414b. In other embodiments, the flow straighteners can include other arrangements of generally parallel walls that extend axially along the direction of flow for a distance sufficient to improve the laminar characteristics of the flow.

In any of the foregoing embodiments that include a controlled, variable vacuum source, a result of controlling the applied vacuum, and therefore the speed with which extracted brewed beverage is delivered from the brew chamber to the beverage chamber, is greater control over the temperature of the extracted beverage. For example, it is expected that using a relatively low vacuum for extracting the bulk of the brewed beverage, and using a relatively high (or higher) vacuum only for a small portion of the extracted beverage, can increase the temperature of the collected beverage volume by values of up to 2° F., up to 4° F., up to 6° F., up to 8° F., up to 10° F., up to 15° F., up to 20° F., or higher. A following result is that the coffee can be provided at a temperature suitable for commercial operations, without the need for heating the coffee in the beverage chamber, which adds complexity to the system, and/or adds time to the overall process, and can potentially scorch the coffee, or cause excessive volatile flavor compound evaporation. A further result is that the solids can be made drier using the high vacuum flow rate (over at least a portion of the extraction process) than if the entire extraction process were conducted at a low vacuum flow rate.

Table 1 below illustrates the results of an experiment conducted to roughly determine the effect of vacuum flow rate on the temperature of extracted volumes of brewed coffee. In this experiment, a total of three cycles of hot water (925 mL, 825 mL, and 250 mL) were run through the same set of coffee grounds (120 grams, ground with a burr grinder). The temperature of the water provided to the brew chamber was 203° F. The flow rate of the vacuum source (e.g., a vacuum pump) was varied from 10 standard cubic feet per hour (SCFH) to 70 SCFH. At each vacuum flow rate, all three cycles were run, and the temperature of the extracted coffee was measured at the end of each cycle. Accordingly, the temperature at the end of cycle 3 reflects the temperature of the combined volume of brewed coffee obtained from cycles 1, 2, and 3. As seen from the results below, the lower vacuum flow rates produced a higher temperature extracted beverage.

TABLE 1

| Vacuum Flow Rate (SCFH) | Extract Temp (° F.) Cycle 1 | Extract Temp (° F.) Cycle 2 | Extract Temp (° F.) Cycle 3 |
|---|---|---|---|
| 10 | 172 | 171 | 174 |
| 20 | 172 | 171 | 173 |
| 25 | 172 | 170 | 171 |
| 30 | 171 | 169 | 170 |
| 70 | 168 | 167 | 166 |

Table 2 below illustrates the effect of using two levels of vacuum to extract the beverage from the brew chamber and into the collection chamber. In particular, a system having a configuration generally similar to that described below with reference to FIG. 5 was tested (a) using a high vacuum flow rate throughout the extraction process (>100 SCFH), and (b) using a low vacuum flow rate at the beginning of the extraction process, and a high vacuum flow rate at the end of the extraction process. Three tests were conducted for each of (a) and (b) above, and each test included three cycles. The cycle volumes and coffee volumes were the same as for the results shown in Table 1, and the water temperature provided to the brew chamber was 203° F. As shown in Table 2, using a low vacuum flow rate at the beginning of the extraction process (10 SCFH for 25 seconds) produced a beverage with a significantly higher (and more acceptable) temperature, while also sufficiently drying the grounds in the brew chamber.

TABLE 2

| (a) High Vacuum Rate Throughout | | | |
| --- | --- | --- | --- |
| Vacuum Flow Rate | Extract Temp (° F.) Cycle 1 | Extract Temp (° F.) Cycle 2 | Extract Temp (° F.) Cycle 3 |
| >100 SCFH (throughout) | 163 163 163 | 164 163 164 | 163 163 164 |

| (b) Low Initial Vacuum Rate, High Subsequent Vacuum Rate | | | |
| --- | --- | --- | --- |
| Vacuum Flow Rate | Extract Temp (° F.) Cycle 1 | Extract Temp (° F.) Cycle 2 | Extract Temp (° F.) Cycle 3 |
| 10 SCFH (first 25 seconds) >100 SCFH (remainder) | 174 174 174 | 172 172 172 | 170 169 170 |

Systems and methods in accordance with the present technology can include other configurations and operations that also control beverage temperature by controlling the vacuum used to draw the beverage from the brew chamber to the beverage chamber, and/or straightening the flow entering the beverage chamber. For example, referring briefly back to FIG. 1, the tubular portion 145 of beverage flow path 105 extending into the beverage chamber 102 can be shorter than is shown in FIG. 1, or can be eliminated entirely, in which case, the beverage can proceed directly through the first beverage port 113*a* to the second beverage port 113*b* into the beverage chamber 102, with or without a flow straightener. An advantage of the elongated tube or tubular portion 145 is that it can control the flow of the incoming beverage over a greater distance, thus reducing the likelihood for the incoming flow to become turbulent and/or spray before it enters the open volume within the beverage chamber 102. Conversely, having a short or non-existent tube 145 may also provide advantages. For example, in the second mode of operation described above, when the higher vacuum flow rate entrains air from the brew chamber 101 and introduces it into the beverage chamber 102, the now-submerged exit 146 of the tube 145 can cause the air to bubble through the beverage that is already in the beverage chamber 102. This in turn can cause the beverage to cool. Reducing the length of the tube 145, or eliminating the tube 145 can eliminate this potential outcome. And while eliminating the tube 145 will cause the spray during the second mode to cool more than it otherwise would (as it travels through the air in the beverage chamber 102 above the collected beverage volume 107), this effect is expected to be minimal because the amount of beverage that enters the beverage chamber 102 during the second mode in the form of a spray is expected to be relatively low.

Figure 5:
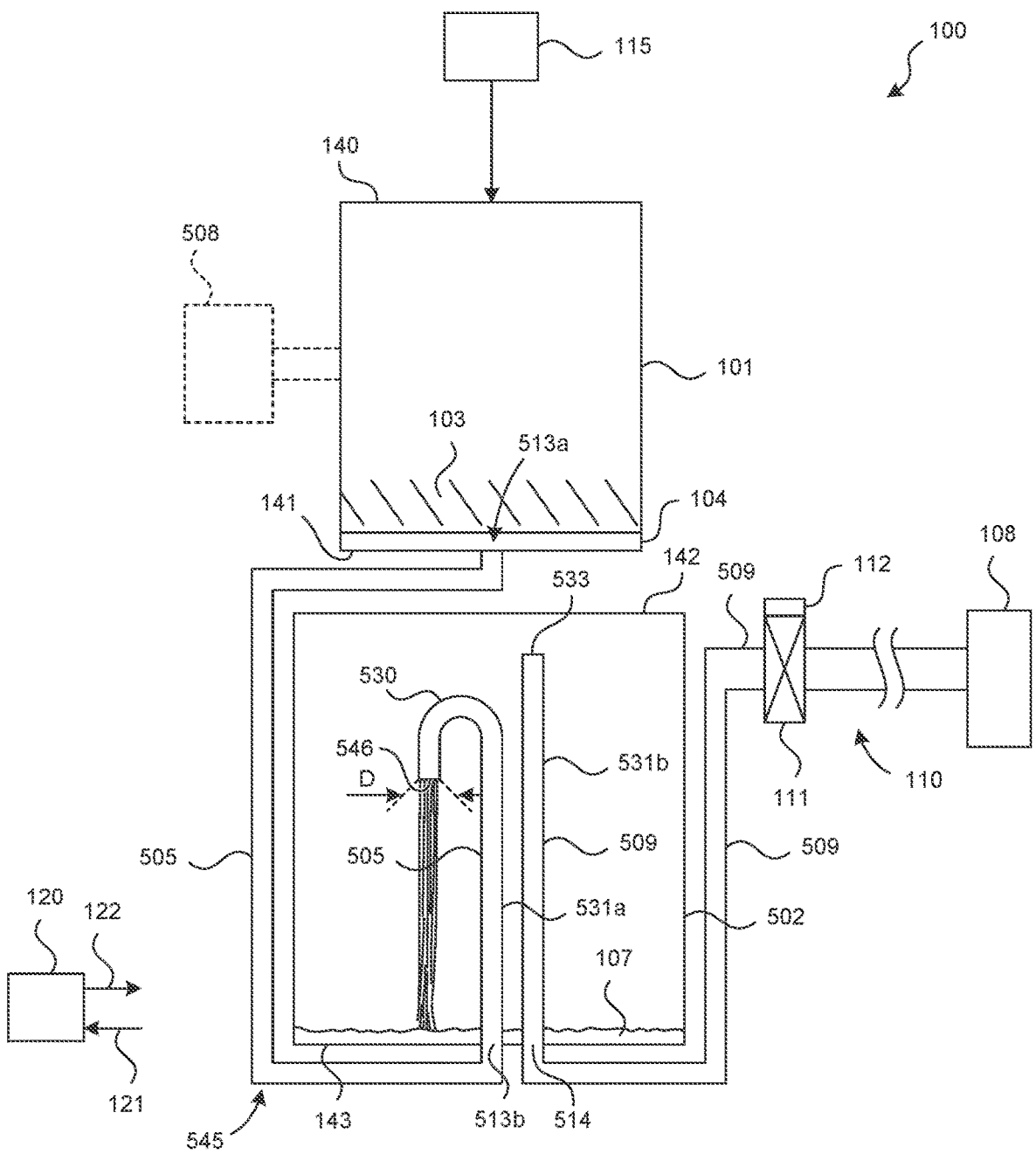
FIG. 5 is a partially schematic, side elevation view of a beverage brewing system having a beverage port and a vacuum port positioned at the bottom of a beverage chamber, in accordance with embodiments of the present technology.

FIG. 5 illustrates a partially schematic view of a beverage brewing system 100 in which the brewed beverage is introduced from the lower surface 143, rather than the upper surface 142, of the corresponding coffee chamber 502. In particular, the system 100 can include a beverage flow path 505 that exits from the lower surface 141 of the brew chamber 101 via a first beverage port 513*a* and enters the beverage chamber 502 via a second beverage port 513*b* positioned at the lower surface 143 of the beverage chamber 502. The beverage flow path 505 can include a tube 545 or other conduit, and can have an upright portion 531*a* and an inverted (e.g., upside down u-shaped) portion 530 that directs the extracted beverage downwardly toward the lower surface 143 of the beverage chamber 502, optionally through a flow straightener proximate to an exit opening 546, generally as discussed above. In addition to, or in lieu of this feature, the system 100 can also include a vacuum flow path 509 that enters through the bottom of the beverage chamber 502. Accordingly, the vacuum flow path 509 can enter through a vacuum port 514 positioned at the lower surface 143 of the beverage chamber 502, and can include an upright portion 531*b* within the beverage chamber 502.

As a result of the arrangement shown in FIG. 5, the exit opening 546 of the beverage flow path 505 and an entrance opening 533 of the vacuum flow path 509 are positioned above the collected beverage volume 107. An advantage of this arrangement is that, during the second mode of operation, air which may be extracted from the brew chamber 101 is not bubbled through the collected beverage volume 107, thereby reducing or eliminating the extent to which such bubbles cool the collected beverage volume 107.

From the foregoing, it will be appreciated that specific embodiments of the disclosed technology have been described herein for purposes of illustration, but that various modifications may be made without deviating from the technology. For example, the brew chamber, beverage flow path, and beverage chamber can have shapes, configurations, and/or relative positions different than those expressly shown and described herein. The flow tube can have locations other than those expressly shown in the Figures, and in some embodiments, the flow tube can be eliminated, as described above. The brew chamber can be above the coffee chamber (e.g., as shown in FIG. 5), or can have other orientations (e.g., below) relative to the beverage chamber.

The vacuum source can be one of multiple types of pressure differential devices. For example, the system can include a pressure source 508 (shown in dashed lines in FIG. 5) that pressurizes the brew chamber 101, in addition to, or in lieu of, the vacuum source 108 drawing a vacuum on the beverage chamber 502. Whether the pressure differential device operates via an elevated or reduced pressure, it can be controlled to produce multiple pressure or vacuum levels resulting in the flow behaviors and/or temperatures described above.

The vacuum flow path can be coupled to the beverage flow path at any of one or more suitable location(s) below the filter, e.g., below the filter in the brew chamber and/or below the filter along the beverage flow path. If coupled along the beverage flow path, the vacuum flow path can include a liquid trap, baffle, and/or condenser to prevent liquid flow to the vacuum source, and/or the beverage flow path can have a double-wall arrangement with primarily liquid in one channel, and primarily vacuum flow in the other. The system can include two modes, more than two modes or a continuously varying mode. In some embodiments, the beverage is extracted with no spray during the first mode and some spray during the second mode. In some embodiments, the beverage is extracted with some spray during the first mode, but less spray than during the second mode. For example, the lateral extent or diameter of the spray can be less during the first mode than during the second mode. In a further particular example, the beverage sprays out over an included angle of 60° during the second mode, and less than 60° (including 0°) during the first mode. In general, the flow is more cohesive (or more of the flow is cohesive) during the first mode than the second mode. And, as discussed above, in at least some cases, the flow is more laminar (or more of the flow is laminar) during the first mode than during the second mode.

In a representative process, the first mode (relatively slow vacuum flow rate) is used at the outset of the extraction process, and the second mode (relatively fast vacuum flow rate) is used at the end of the extraction process. More generally, the disclosed technology applies to other processes in which the two modes may be used together. For example, in other representative processes, the first and second modes can be separated by, preceded by, and/or followed by, other modes. Depending upon the implementation, the first mode can be used for a longer period of time (or for a greater beverage volume) than the second mode, or vice versa.

The flow control device can include other arrangements for controlling the speed with which flow exits the brew chamber and enters the beverage chamber in a more cohesive manner (at a relatively slow flow rate) or a less cohesive manner (at a relatively high flow rate). For example, the vacuum flow rate can be changed by directly controlling the flow rate produced by the vacuum source, whether the source includes a pump, pre-evacuated chamber, or other device. In further embodiments, the system can include multiple pumps (or other vacuum sources), each of which may produce a different flow rate, and each of which can be connected in fluid communication with the beverage flow path at different times and/or in different combinations to produce corresponding different vacuum flow rates. For example, two different vacuum pumps, each with a different associated flow rate, can be "tee'd" to the vacuum flow path and selectively activated via the controller (e.g., in combination with a selector valve) to produce at least three vacuum levels: one with the first pump, one with the second pump, and one with both pumps. The pumps, when started, can ramp up to a target output level.

In still another embodiment, the beverage chamber 102 itself can serve as a blow-down vacuum source. For example, the vacuum chamber 102 can be pre-evacuated, while a valve in the beverage flow path 105, or at the beverage port 113, prevents the vacuum within the beverage chamber 102 from drawing down the brewing chamber 101 until the brewing process is complete. Once the brewing process is complete, the valve can be opened to draw the beverage into the beverage chamber 102. The rate at which the beverage is drawn into the beverage chamber 102 can be controlled by controlling the position of the valve. In such an embodiment, the system will typically include a pump or other suitable device to draw down the beverage chamber 102 after each beverage evacuation cycle.

As described above, the system can be used to produce a coffee beverage, or other beverage. In particular, the system can be used for any suitable beverage formed from a consumable (e.g., coffee, cacao, tea, or other agent) and a solvent (e.g., water). Further details of processes that include cacao extraction are presented in U.S. Provisional Application No. 62/653,300, previously incorporated herein by reference.

Representative embodiments of the present technology were described in the context of a multi-extraction process, e.g., a process in which the same grounds are used for multiple brewing and extraction cycles. In other embodiments, the technology disclosed herein can be applied to processes that include only a single brewing and extraction operation.

Certain aspects of the technology described in the context of particular embodiments may be combined or eliminated in other embodiments. For example, as discussed above, the first and second flow control devices may be used in the same device, or individually, depending upon factors including target flow rates and/or temperatures. In another example, the foregoing systems and processes can be used in the context of a single-extraction process, rather than a multi-extraction process, although it is believed that the full benefits (e.g., including drying the solids) are better realized in the context of a multi-extraction process. The valve arrangement shown in FIG. 2 can be used with the overall system shown in FIG. 5. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the phrase "and/or" as in "A and/or B" refers to A alone, B alone, and both A and B. To the extent any materials incorporated herein by reference conflict with the present disclosure, the present disclosure controls.

The following examples provide additional representative embodiments of the present technology.

1. A beverage brewing system, comprising:
a brew chamber;
a beverage chamber in fluid communication with the brew chamber;
a vacuum source in fluid communication with the beverage chamber; and
a flow control device positioned to vary the force applied by the vacuum chamber on the brew chamber via the beverage chamber.

2. The system of clause 1 wherein the flow control device includes a multi-position valve.

3. The system of any of the foregoing clauses wherein the flow control device is a first flow control device, and wherein the system further comprises a second flow control device, the second flow control device including a flow straightener.

4. The system of any of the foregoing clauses wherein in a first configuration, the flow control device produces a laminar, continuous flow of beverage from the brew chamber into the beverage chamber, and wherein in a second configuration, the flow control device produces a spray or a discontinuous turbulent flow of beverage from the brew chamber into the beverage chamber.

5. The system of clause 1 wherein the brew chamber has a lower surface and the beverage chamber has an upper surface, and wherein the system further comprises a beverage flow path extending through the lower surface of the brew chamber and the upper surface of the beverage chamber.

6. The system of clause 1 wherein the brew chamber has a lower surface and the beverage chamber has a lower surface, and wherein the system further comprises a beverage flow path extending through the lower surface of the brew chamber and upwardly through the lower surface of the beverage chamber.

7. The system of clause any of the foregoing clauses wherein the vacuum source includes a vacuum pump.

8. The system of clause any of the foregoing clauses, further comprising a hot water source coupled to the brew chamber.

9. A beverage brewing system, comprising:
a hot water source;
a brew chamber coupled to the hot water source to receive hot water, the brew chamber having:
a support positioned to receive coffee grounds,
a first beverage port, and
a filter positioned to at least restrict the passage of coffee grounds from the brew chamber through the first beverage port;
a beverage chamber having lower surface, with a second beverage port and a vacuum port positioned in the lower surface;
a beverage flow path coupled between the first and second beverage ports to direct coffee from the brew chamber into the beverage chamber, the beverage flow path having an upright portion and an inverted portion within the beverage chamber, the inverted portion having a beverage exit opening positioned to direct coffee downwardly toward the lower surface;
a vacuum source;
a vacuum flow path coupled between the vacuum source and the vacuum port of the beverage chamber, the vacuum flow path having an upright portion and a vacuum entrance opening within the beverage chamber; and
a flow control device coupled between the vacuum source and the vacuum entrance opening to vary the force applied by the vacuum chamber on the brew chamber via the beverage chamber.

10. The system of clause 9 wherein the flow control device includes a valve.

11. The system of any of clauses 9-10 wherein the flow control device includes a first portion having a first flow area, a second portion in parallel with the first portion and having a second flow area greater than the first flow area, and a selector coupled to the first and second portions to select between the first and second flow portions.

12. The system of any of clauses 9-11 wherein the vacuum source includes a vacuum pump.

13. The system of any of clauses 9-12 wherein the vacuum source includes a blow-down chamber.

14. A beverage brewing system, comprising:
a brew chamber;
a beverage chamber;
a beverage flow path coupled between the brew chamber and the beverage chamber and having an exit positioned to direct a beverage into the beverage chamber;
a pressure differential device operatively coupled to at least one of the brew chamber or the beverage chamber; and
a flow straightener positioned along the beverage flow path, the flow straightener having multiple, parallel, axially extending flow channels positioned proximate to the exit of the beverage flow path.

15. The system of claim 14 wherein the flow channels have a rectangular cross-sectional shape.

16. The system of claim 14 wherein the flow channels have a hexagonal cross-sectional shape.

17. The system of any of claims 14-16 wherein the beverage flow path includes a tube extending into the beverage chamber, and wherein the flow straightener is positioned at the end of the tube.

18. The system of any of claims 14-17 wherein the flow straightener is the second of two flow control devices, and wherein the pressure differential device includes:
a vacuum source in fluid communication with the beverage chamber; and
a first flow control device positioned to vary the force applied by the vacuum chamber on the brew chamber via the beverage chamber.

19. A method for brewing a beverage, comprising:
in a brew chamber, mixing hot water with solids;
over the course of an extraction period, directing a beverage formed from the hot water and solids from the brew chamber to a beverage chamber under a force applied to the brew chamber by a vacuum source; and
changing the force applied to the brew chamber from a first value during a first portion of the extraction period to a second value, higher than the first value, during a second portion of the extraction period subsequent to the first portion of the extraction period.

20. The method of clause 19 wherein, during the first portion of the extraction period, the beverage flows into the beverage chamber as a laminar flow.

21. The method of any of clauses 19-20 wherein, during the second portion of the extraction period, the beverage flows into the beverage chamber as a turbulent flow.

22. The method of any of clauses 19-21 wherein, during the second portion of the extraction period, the beverage flows into the beverage chamber as a spray.

23. The method of any of clauses 19-22 wherein changing the force includes changing a setting of a valve operatively coupled between the vacuum source and the beverage chamber.

24. The method of any of clauses 19-22 wherein changing the force includes increasing a flow area of a vacuum flow path coupled between the vacuum source and the beverage chamber.

25. The method of any of clauses 19-24 wherein directing the beverage includes directing the beverage downwardly into the beverage chamber through a port in an upper surface of the beverage chamber.

26. The method of any of clauses 19-25 wherein directing the beverage includes directing the beverage upwardly into the beverage chamber through though a port in a lower surface of the beverage chamber.

27. The method of any of clauses 19-25 wherein, directing the beverage incudes directing the beverage upwardly into the beverage chamber via a flow path, and directing the beverage downwardly toward the lower surface through an exit in the flow path.

28. The method of any of clauses 19-27 wherein the solids are coffee grounds and wherein the beverage is coffee.

29. The method of any of clauses 19-27 wherein the solids are ground tea leaves.

30. The method of any of clauses 19-27 wherein the solids are cacao grounds.

We claim:
1. A method for brewing a beverage, comprising:
in a brew chamber, mixing water with solids;
over a course of an extraction period, directing the beverage formed from the water and the solids from the brew chamber to a beverage chamber under a force applied to the brew chamber by a vacuum source; and changing the force applied to the brew chamber from a first, non-zero value during a first portion of the extraction period to a second, non-zero value, higher than the first value, during a second portion of the extraction period subsequent to the first portion of the extraction period.

2. The method of claim 1 wherein, during the first portion of the extraction period, the beverage flows into the beverage chamber as a laminar flow.

3. The method of claim 1 wherein, during the second portion of the extraction period, the beverage flows into the beverage chamber as a turbulent flow.

4. The method of claim 1 wherein, during the second portion of the extraction period, the beverage flows into the beverage chamber as a spray.

5. The method of claim 1 wherein changing the force includes changing a setting of a valve operatively coupled between the vacuum source and the beverage chamber.

6. The method of claim 1 wherein changing the force includes increasing a flow area of a vacuum flow path coupled between the vacuum source and the beverage chamber.

7. The method of claim 1 wherein directing the beverage includes directing the beverage downwardly into the beverage chamber through a port in an upper surface of the beverage chamber.

8. The method of claim 1 wherein directing the beverage includes directing the beverage upwardly into the beverage chamber through a port in a lower surface of the beverage chamber.

9. The method of claim 8 wherein directing the beverage includes directing the beverage upwardly into the beverage chamber via a flow path, and directing the beverage downwardly toward the lower surface through an exit in the flow path.

10. The method of claim 1 wherein the solids are coffee grounds and wherein the beverage is coffee.

11. The method of claim 1 wherein the solids are ground tea leaves.

12. The method of claim 1 wherein the solids are cacao grounds.

13. A method for brewing a beverage, comprising:

in a brew chamber, mixing water with solids;

over a course of an extraction period, directing the beverage formed from the water and the solids from the brew chamber to a beverage chamber under a force applied to the brew chamber by a vacuum source; and changing the force applied to the brew chamber from a first value during a first portion of the extraction period to a second value, higher than the first value, during a second portion of the extraction period subsequent to the first portion of the extraction period, wherein, during the first portion of the extraction period, the beverage flows into the beverage chamber as a laminar flow.

14. The method of claim 13 wherein the solids are coffee grounds and wherein the beverage is coffee.

15. The method of claim 13 wherein the solids are ground tea leaves.

16. A method for brewing a beverage, comprising:

in a brew chamber, mixing water with solids;

over a course of an extraction period, directing the beverage formed from the water and the solids from the brew chamber to a beverage chamber under a force applied to the brew chamber by a vacuum source; and changing the force applied to the brew chamber from a first value during a first portion of the extraction period to a second value, higher than the first value, during a second portion of the extraction period subsequent to the first portion of the extraction period, wherein changing the force includes increasing a flow area of a vacuum flow path coupled between the vacuum source and the beverage chamber.

17. The method of claim 16 wherein the solids are coffee grounds and wherein the beverage is coffee.

18. The method of claim 16 wherein the solids are ground tea leaves.

19. A method for brewing a beverage, comprising:

in a brew chamber, mixing water with solids;

over a course of an extraction period, directing the beverage formed from the water and the solids from the brew chamber to a beverage chamber under a force applied to the brew chamber by a vacuum source, wherein directing the beverage includes directing the beverage upwardly into the beverage chamber through a port in a lower surface of the beverage chamber; and changing the force applied to the brew chamber from a first value during a first portion of the extraction period to a second value, higher than the first value, during a second portion of the extraction period subsequent to the first portion of the extraction period.

20. The method of claim 19 wherein the solids are coffee grounds and wherein the beverage is coffee.

21. The method of claim 19 wherein the solids are ground tea leaves.

22. A method for brewing a beverage, comprising:

in a brew chamber, mixing water with solids;

over a course of an extraction period, directing the beverage formed from the water and the solids from the brew chamber to a beverage chamber under a force applied to the brew chamber by a vacuum source, wherein directing the beverage includes directing the beverage upwardly into the beverage chamber via a flow path, and directing the beverage downwardly toward a lower surface through an exit in the flow path; and changing the force applied to the brew chamber from a first value during a first portion of the extraction period to a second value, higher than the first value, during a second portion of the extraction period subsequent to the first portion of the extraction period.

23. The method of claim 22 wherein the solids are coffee grounds and wherein the beverage is coffee.

24. The method of claim 22 wherein the solids are ground tea leaves.

\* \* \* \* \*